(12) United States Patent
Oglesbee et al.

(10) Patent No.: US 9,003,500 B2
(45) Date of Patent: Apr. 7, 2015

(54) METHOD AND SYSTEM FOR FACILITATING SYNCHRONIZING MEDIA CONTENT BETWEEN A VEHICLE DEVICE AND A USER DEVICE

(75) Inventors: Robert J. Oglesbee, Smyrna, GA (US); Dane Dickie, Atlanta, GA (US); Charles M. Link, II, Atlanta, GA (US)

(73) Assignee: HTI IP, LLC, Atlanta, GA (US)

( * ) Notice: Subject to any disclaimer, the term of this patent is extended or adjusted under 35 U.S.C. 154(b) by 577 days.

(21) Appl. No.: 12/724,296

(22) Filed: Mar. 15, 2010

(65) Prior Publication Data

US 2010/0235891 A1 Sep. 16, 2010

Related U.S. Application Data

(63) Continuation-in-part of application No. 12/719,756, filed on Mar. 8, 2010.

(60) Provisional application No. 61/159,846, filed on Mar. 13, 2009.

(51) Int. Cl.
*H04L 29/06* (2006.01)
*H04L 29/08* (2006.01)
*H04W 4/02* (2009.01)

(52) U.S. Cl.
CPC .......... *H04L 67/1095* (2013.01); *H04L 67/125* (2013.01); *H04W 4/02* (2013.01); *H04W 4/021* (2013.01); *H04L 67/303* (2013.01); *H04L 67/306* (2013.01); *H04L 67/2842* (2013.01)

(58) Field of Classification Search
CPC .................................................. H04L 67/1095
USPC .................. 726/5; 701/213, 215; 342/357.25, 342/357.39
See application file for complete search history.

(56) References Cited

U.S. PATENT DOCUMENTS

| | | | | |
|---|---|---|---|---|
| 7,039,708 B1* | 5/2006 | Knobl et al. | .................. | 709/227 |
| 7,139,660 B2* | 11/2006 | Sarkar et al. | .................... | 701/36 |
| 7,356,389 B2* | 4/2008 | Holst et al. | ........................ | 701/3 |
| 7,706,967 B2* | 4/2010 | Knockeart et al. | ............ | 701/119 |
| 8,027,671 B2* | 9/2011 | Wallace et al. | ............... | 455/420 |
| 8,086,368 B2* | 12/2011 | Petricoin et al. | ............. | 701/31.4 |

(Continued)

OTHER PUBLICATIONS

Vehicle-to-vehicle wireless communication protocols for enhancing highway traffic safety; Biswas et al; Communications Magazine, IEEE, 2006; 9 pages.*

(Continued)

*Primary Examiner* — Jason Lee

(57) ABSTRACT

A user uploads content such as files containing audio, video, graphical, data, points of interest, and other information from a user device such as a personal computer to a central server over the internet. Upon determining that a trigger event has occurred, communication and processing circuitry in a vehicle device automatically download the previously uploaded content over the interne and a short-range wireless network and store the content for use by a device such as an audio/visual/navigation unit. Examples of a trigger event include proximity to a short-range wireless communication network coupled to the internet, presence within a geofence, turning off a vehicle's engine, or detecting an SMS wake-up message while the vehicle device's main processor, transceivers not used for SMS, and auxiliary circuitry are in sleep mode. The short-range wireless network can be a vehicle owner's home network, or a commercial wi-fi hot spot, or subscription wireless service.

20 Claims, 11 Drawing Sheets

(56) References Cited

U.S. PATENT DOCUMENTS

| | | |
|---|---|---|
| 2004/0010358 A1 | 1/2004 | Oesterling et al. |
| 2005/0027438 A1 | 2/2005 | Rockett et al. |
| 2005/0100174 A1 | 5/2005 | Howard et al. |
| 2005/0177478 A1 | 8/2005 | Mazzara |
| 2008/0004788 A1 | 1/2008 | Dorfstatter et al. |
| 2008/0275604 A1 | 11/2008 | Perry et al. |
| 2009/0005966 A1 | 1/2009 | McGray et al. |
| 2009/0243925 A1 | 10/2009 | Kellermeier et al. |

OTHER PUBLICATIONS

MAC for dedicated short range communications in intelligent transport system; Zhu et al ; IEEE Communications Magazine, IEEE, 2003; 9 pages.*

* cited by examiner

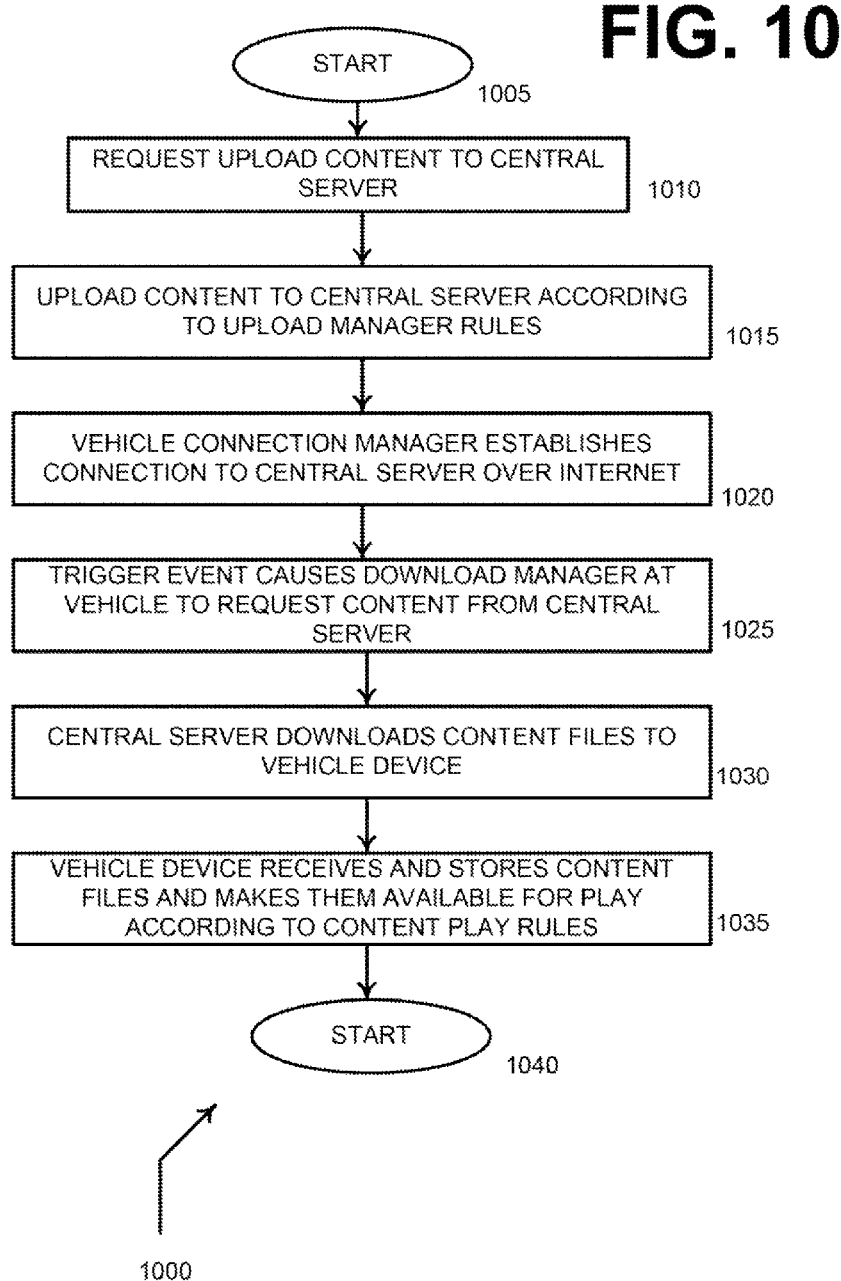

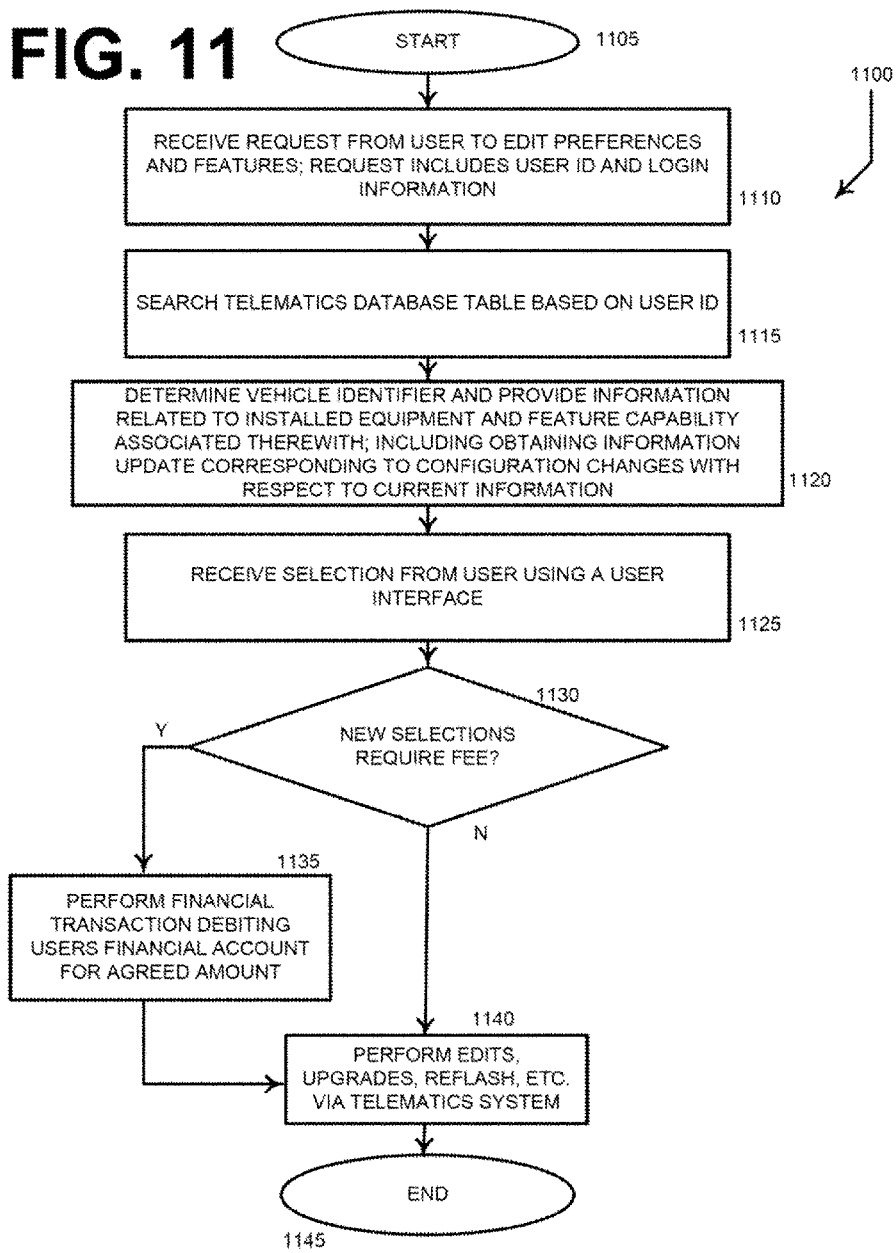

METHOD AND SYSTEM FOR FACILITATING SYNCHRONIZING MEDIA CONTENT BETWEEN A VEHICLE DEVICE AND A USER DEVICE

CROSS REFERENCE TO RELATED APPLICATION

This application claims priority under 35 U.S.C. 119(e) to U.S. provisional patent application No. 61/159,846 entitled "Method and system for facilitating synchronizing the transfer of media content between a vehicle and a user device," which was filed Mar. 13, 2009, and which is incorporated herein by reference in its entirety. This application also claims priority under 35 U.S.C. 120 to, and is a continuation-in-part of, U.S. patent application Ser. No. 12/719,756 entitled "Method and system for configuring and provisioning a vehicle," which was filed Mar. 10, 2010, and which is incorporated herein by reference in its entirety.

FIELD

The present invention relates to telematics systems, and more particularly to synchronizing media content between a device in a vehicle and a user device remote from the vehicle using a listing of vehicle equipment and corresponding supported features and capabilities, and providing an interface that a user can, remotely from the vehicle, manage the synchronization of content over an internetwork.

SUMMARY

Provided are methods and systems for digital content manipulation. Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 10 illustrates a flow diagram of a method for wirelessly downloading content from a user device to a vehicle device over an internetwork.
FIG. 11 illustrates a flow diagram of a method for facilitating selecting content to download to a vehicle device based on equipment, software, and content installed in the vehicle.

DETAILED DESCRIPTION

Figure 1:
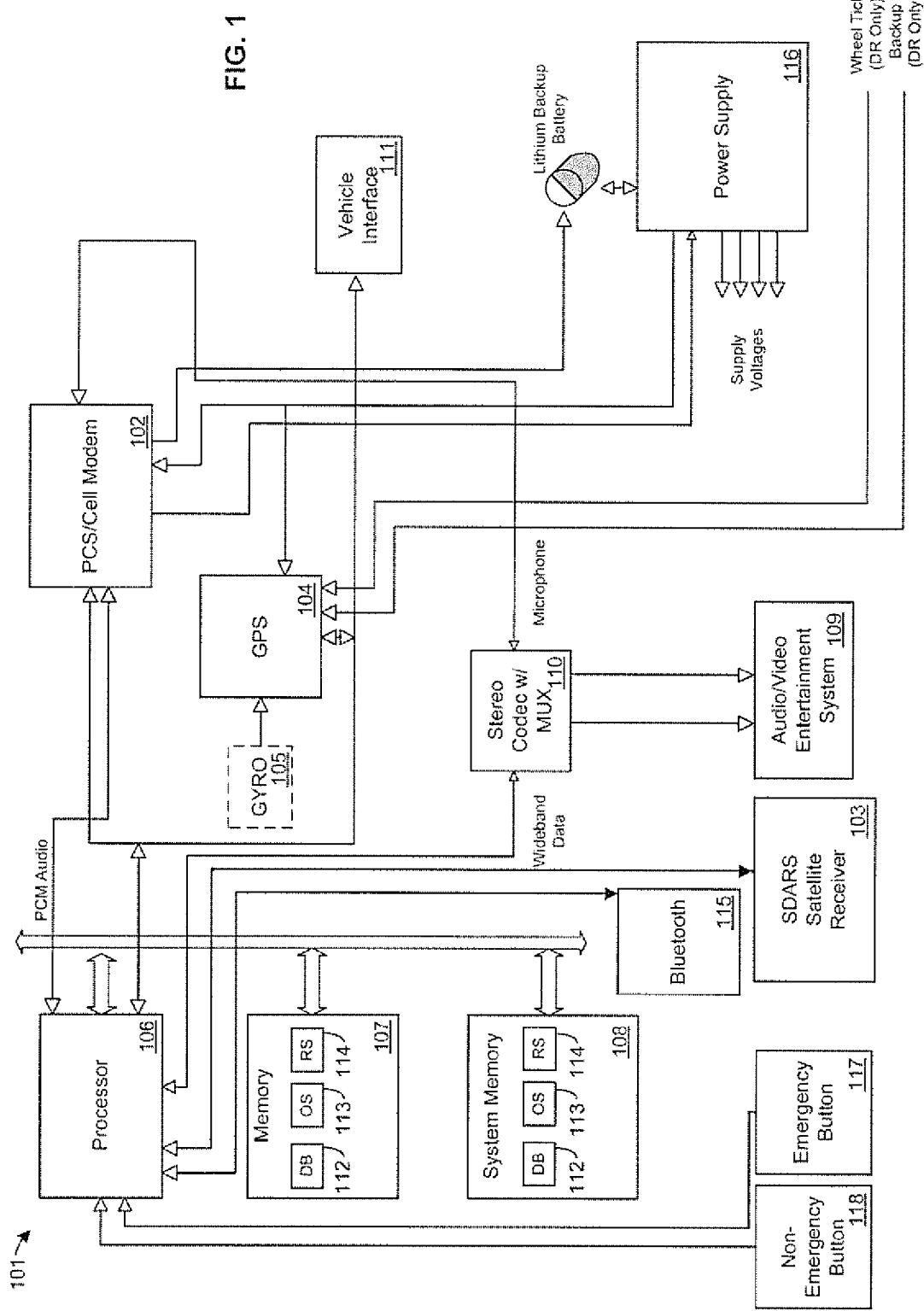
FIG. 1 is an exemplary vehicle telematics unit.

Before the present methods and systems are disclosed and described, it is to be understood that the methods and systems are not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

In an aspect, provided are methods and systems for discovery, transfer and synchronization of media existing on the Internet (or other public networks) and/or a private network. The methods and systems provided can transfer the media to a vehicle for storage in digital format for consumption (listening, control, viewing, playing) at a later time when the vehicle may or may not be connected to a network. Consumption can be via embedded vehicle audio, video and control systems (i.e. headrest LCD screens and surround sound systems) or via 3rd party devices (i.e. laptops) brought into the vehicle and connected wirelessly (i.e. Wi-Fi or W-LAN) or wired.

As used herein, "media" (used herein interchangeably with "digital content" or "content") can refer to any digital form of content in the broad context of entertainment and information. For example, media can include but is not limited to, music (clips, songs, albums), audiobooks, podcasts, television programs, movies, video clips, games, ringtones, wall- 'papers, screensavers, vehicle specific sounds and tones, vehicle specific media (i.e. manuals), vehicle specific voices (i.e., for control systems), vehicle settings and profiles (i.e., lighting), emails, SMS messages, text files, Microsoft Word files, Microsoft Excel files, Microsoft Powerpoint files, Adobe PDF files, world wide web content, cached web pages, newsgroups, RSS feeds, and the like. Digital content can also comprise credentials necessary for accessing one or more networks, such as service set identifiers (SSIDs), wireless encryption protocol (WEP) keys, Wi-Fi protected access (WPA) keys, and the like.

The methods and systems can manage a large variety of file types and can manage any necessary digital rights management (DRM) and licensing restrictions. File types can include, but are not limited to, Advanced Audio Coding (AAC), Audio Interchange File Format (.aif, .aifc, .aiff), Audio for Windows (.wav), Audio Visual Interleave (.avi), CD Audio Track (.cda), Indeo Video Technology (.ivf), Microsoft Digital Video Recording (.dvr-ms), Moving Pictures Experts Group (.mpg, .mpeg, .m1v, .mp2, .mp3, .mpa, .mpe, .mpv2, .m3u), MPEG-4 (.mp4), Musical Instrument Digital Interface (.mid, .midi, .rmi), QuickTime Content (.mov, .qt), RealNetworks content (.ra, .rm, .ram), Windows Media formats (.asf, .wma, .wmv, .wm), Windows Media Metafiles (.asx, .wax, .wvx, .wpl), Windows Media Download Package (.wmd), Joint Photographic Experts Group (.jpg, .jpeg), Tagged Image File Format (.tif), Portable Network Graphics (.png), Graphics Interchange Format (.gif), bitmap (.bmp), Scalable Vector Graphics (.svg), and the like. DRM can include, but is not limited to, Apple Fairplay, Windows Media DRM, and the like.

In an aspect, provided are methods and systems for discovering and authenticating a vehicle (i.e. sign-on) to public and/or private, wired and/or wireless networks. In an aspect, the methods and systems can discover available media on any network and discern ability of vehicle system to transfer or copy and render (play) the media including managing any subscriptions fees, licenses, DRM constraints and make payments if applicable. In an aspect, the methods and systems can transfer the media to storage within the vehicle compliant with any licensing and DRM constraints or restrictions. In an aspect, the methods and systems can control the delivery, rendering, playing of all media files via vehicle systems. In an aspect, the methods and systems can track the consumption of media and control the deletion of viewed or expired media as well as requests for replacement media (i.e. when a movie is viewed the system can delete the viewed movie and request a new movie for download). In an aspect, the methods and systems can track consumption of digital media for compensating media partners.

The methods and systems provided can leverage content provided by third parties. For example, Amazon, Rhapsody, iTunes: Enable the download of songs either currently playing on radio or those tagged as favorites. In another example, SimplyAudiobooks: Purchase audio-book while refueling on long trip. In another example, TiVo, Dish Network: enable the transfer of television shows from DVR to vehicle. In another example, GameTap: enable in vehicle version of favorite PC game.

In one aspect, provided is a media sync apparatus comprising a telematics unit. The apparatus can be installed in a vehicle. Such vehicles include, but are not limited to, personal and commercial automobiles, motorcycles, transport vehicles, watercraft, aircraft, and the like. For example, an entire fleet of a vehicle manufacturer's vehicles can be equipped with the apparatus. The vehicle apparatus, or vehicle device, 101 is also referred to herein as the TCU or VTU. The apparatus can perform any of the methods disclosed herein in part and/or in their entireties.

In an aspect, all components of the vehicle telematics device can be contained within a single box and can be controlled with a single core processing subsystem. In another aspect, the components can be distributed throughout a vehicle. Each of the components of the apparatus can be separate subsystems of the vehicle, for example, a communications component such as a SDARS, or other satellite receiver, can be coupled with an entertainment system of the vehicle.

An exemplary apparatus 101 is illustrated in FIG. 1. This exemplary apparatus is only an example of an apparatus and is not intended to suggest any limitation as to the scope of use or functionality of operating architecture. Neither should the apparatus be necessarily interpreted as having any dependency or requirement relating to any one or combination of components illustrated in the exemplary apparatus. The apparatus 101 can comprise one or more communications components. Apparatus 101 illustrates communications components (modules) PCS/Cell Modem 102 and SDARS receiver 103. These components can be referred to as vehicle mounted transceivers when located in a vehicle. PCS/Cell Modem 102 can operate on any frequency available in the country of operation, including, but not limited to, the 850/1900 MHz cellular and PCS frequency allocations. The type of communications can include, but is not limited to GPRS, EDGE, UMTS, 1xRTT or EV-DO. The PCS/Cell Modem 102 can be a Wi-Fi or mobile WIMAX implementation that can support operation on both licensed and unlicensed wireless frequencies. The apparatus 101 can comprise an SDARS receiver 103 or other satellite receiver. SDARS receiver 103 can utilize high powered satellites operating at, for example, 2.35 GHz to broadcast digital content to automobiles and some terrestrial receivers, generally demodulated for audio content, but can contain digital data streams.

PCS/Cell Modem 102 and SDARS receiver 103 can be used to update an onboard database 112 contained within the apparatus 101. Updating can be requested by the apparatus 101, or updating can occur automatically. For example, database updates can be performed using FM subcarrier, cellular data download, other satellite technologies, Wi-Fi and the like. SDARS data downloads can provide the most flexibility and lowest cost by pulling digital data from an existing receiver that exists for entertainment purposes. An SDARS data stream is not a channelized implementation (like AM or FM radio) but a broadband implementation that provides a single data stream that is separated into useful and applicable components.

GPS receiver 104 can receive position information from a constellation of satellites operated by the U.S. Department of Defense. Alternately, the GPS receiver 104 can be a GLONASS receiver operated by the Russian Federation Ministry of Defense, or any other positioning device capable of providing accurate location information (for example, LORAN, inertial navigation, and the like). GPS receiver 104 can contain additional logic, either software, hardware or both to receive the Wide Area Augmentation System (WAAS) signals, operated by the Federal Aviation Administration, to correct dithering errors and provide the most accurate location possible. Overall accuracy of the positioning equipment subsystem containing WAAS is generally in the two meter range. Optionally, the apparatus 101 can comprise a MEMS gyro 105 for measuring angular rates and wheel tick inputs for determining the exact position based on dead-reckoning techniques. This functionality is useful for determining accurate locations in metropolitan urban canyons, heavily tree-lined streets and tunnels.

In an aspect, the GPS receiver 104 can activate on ignition or start of motion. The GPS receiver 104 can go into idle on ignition off or after ten minutes without motion. Time to first fix can be <45s 90% of the time. For example, this can be achieved either through chipset selection or periodic wake-up.

One or more processors 106 can control the various components of the apparatus 101. Processor 106 can be coupled to removable/non-removable, volatile/non-volatile computer storage media. By way of example, FIG. 1 illustrates memory 107, coupled to the processor 106, which can provide non-volatile storage of computer code, computer readable instructions, data structures, program modules, and other data for the computer 101. For example and not meant to be limiting, memory 107 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like. Data obtained and/or determined by processor 106 can be displayed to a vehicle occupant and/or transmitted to a remote processing center. This transmission can occur over a wired or a wireless network. For example, the transmission can utilize PCS/Cell Modem 102 to transmit the data. The data can be routed through the Internet where it can be accessed, displayed and manipulated.

The processing of the disclosed systems and methods can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Any number of program modules can be stored on the memory 107, including by way of example, an operating system 113 and software 114. Each of the operating system 113 and software 114 (or some combination thereof) can comprise elements of the programming and the software 114. Data can also be stored on the memory 107 in database 112. Database 112 can be any of one or more databases known in the art. Examples of such databases comprise, DB2®, Microsoft® Access, Microsoft® SQL Server, Oracle®, mySQL, PostgreSQL, and the like. The database 112 can be centralized or distributed across multiple systems. The software 114 can comprise telematics software and the data can comprise telematics data.

In some aspects, data can be stored and transmitted in loss-less compressed form and the data can be tamper-proof. Non-limiting examples of data that can be collected are as follows. After a connection is established the protocol being used can be stored. A timestamp can be recorded on ignition for one or more trips. The telematics apparatus 101 can sample vehicle speed every second (or more frequently) during the trip, and maintain a speed log stored in memory. Crash events can be stored (for example, as approximated via OBD II speed). By way of example, GPS related data that recorded during one or more trips can comprise one or more of, time, latitude, longitude, altitude, speed, heading, horizontal dilution of precision (HDOP), number of satellites locked, and the like. In one aspect, recorded data can be transmitted from the apparatus to a back-office for integrity verification and then via, for example, a cellular network. Once validated, data can be pushed to a company via established web-services & protocols.

By way of example, the operating system 113 can be a Linux (Unix-like) operating system. One feature of Linux is that it includes a set of "C" programming language functions referred to as, "NDBM". NDBM is an API for maintaining key/content pairs in a database which allows for quick access to relatively static information. NDBM functions use a simple hashing function to allow a programmer to store keys and data in data tables and rapidly retrieve them based upon the assigned key. A major consideration for an NDBM database is that it only stores simple data elements (bytes) and requires unique keys to address each entry in the database. NDBM functions provide a solution that is among the fastest and most scalable for small processors.

It is recognized that such programs and components reside at various times in different storage components of the apparatus 101, and are executed by the processor 106 of the apparatus 101. An implementation of reporting software 114 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

FIG. 1 illustrates system memory 108, coupled to the processor 106, which can comprise computer readable media in the form of volatile memory, such as random access memory (RAM, SDRAM, and the like), and/or non-volatile memory, such as read only memory (ROM). The system memory 108 typically contains data and/or program modules such as operating system 113 and software 114 that are immediately accessible to and/or are presently operated on by the processor 106. The operating system 113 can comprise a specialized task dispatcher, slicing available bandwidth among the necessary tasks at hand, including communications management, position determination and management, entertainment radio management, SDARS data demodulation and assessment, power control, and vehicle communications.

The processor 106 can control additional components within the apparatus 101 to allow for ease of integration into vehicle systems. The processor 106 can control power to the components within the apparatus 101, for example, shutting off GPS receiver 104 and SDARS receiver 103, and other wireless transceivers, when the vehicle is inactive, and alternately shutting off the PCS/Cell Modem 102 to conserve the vehicle battery when the vehicle is stationary for long periods of inactivity. The processor 106 can also control an audio/video entertainment subsystem 109 and comprise a stereo codec and multiplexer 110 for providing entertainment audio and video to the vehicle occupants, for providing wireless communications audio (PCS/Cell phone audio), speech recognition from the driver compartment for manipulating the SDARS receiver 103 and PCS/Cell Modem 102 phone dialing, and text to speech and pre-recorded audio for vehicle status annunciation.

The apparatus 101 can interface and monitor various vehicle systems and sensors to determine vehicle conditions. Apparatus 101 can interface with a vehicle through a vehicle interface 111. The vehicle interface 111 can include, but is not limited to, OBD (On Board Diagnostics) port, OBD-II port, CAN (Controller Area Network) port, and the like. A cable can be used to connect the vehicle interface 111 to a vehicle. Any type of cable capable of connecting to a vehicle diagnostics port can be used. In one aspect, an OBD II connector cable can be used that follows the J1962 trapezoidal connector specification, the J1939 or J1708 round connector specifications, and the like. A communication protocol such as, J1850 PWM, J1850 VPW, ISO9141-2, ISO14230-4, and the like can be used to collect data through the vehicle interface 111. The vehicle interface 111, allows the apparatus 101 to receive data indicative of vehicle performance, such as vehicle trouble codes, operating temperatures, operating pressures, speed, fuel air mixtures, oil quality, oil and coolant temperatures, wiper and light usage, mileage, break pad conditions, and any data obtained from any discrete sensor that contributes to the operation of the vehicle engine and drive-train computer. Additionally CAN interfacing can eliminate individual dedicated inputs to determine brake usage, backup status, and it can allow reading of onboard sensors in certain vehicle stability control modules providing gyro outputs, steering wheel position, accelerometer forces and the like for determining driving characteristics. The apparatus 101 can interface directly with a vehicle subsystem or a sensor, such as an accelerometer, gyroscope, airbag deployment computer, and the like. Data obtained from, and processed data derived from, the various vehicle systems and sensors can be transmitted to a central monitoring station via the PCS/Cell Modem 102.

Data obtained and/or determined by processor 106 can be displayed to a vehicle occupant and/or transmitted to a remote processing center. This transmission can occur over a wired or a wireless network. For example, the transmission can utilize PCS/Cell Modem 102, or W-LAN circuitry to transmit the data. The wireless circuitry may wirelessly transmit and receive information according to Open Mobile Alliance Data Synchronization and Device Management The data can be routed through the Internet where it can be accessed, displayed and manipulated.

The apparatus 101 can interface and monitor various vehicle systems and sensors to determine vehicle conditions. Apparatus 101 can interface with a vehicle through a vehicle interface 111. The vehicle interface 111 can include, but is not limited to, OBD (On Board Diagnostics) port, OBD-II port, CAN (Controller Area Network) port, and the like. The vehicle interface 111, allows the apparatus 101 to receive data indicative of vehicle performance, such as vehicle trouble codes, operating temperatures, operating pressures, speed, fuel air mixtures, oil quality, oil and coolant temperatures, wiper and light usage, mileage, break pad conditions, and any data obtained from any discrete sensor that contributes to the operation of the vehicle engine and drive-train computer. Vehicle device 101 can also use performance data, and other operational data, to determine whether the vehicle corresponding to it is moving, and whether the engine in it is running. Additionally CAN interfacing can eliminate individual dedicated inputs to determine brake usage, backup status, and it can allow reading of onboard sensors in certain vehicle stability control modules providing gyro outputs, steering wheel position, accelerometer forces and the like for determining driving characteristics. The apparatus 101 can interface directly with a vehicle subsystem or a sensor, such as an accelerometer, gyroscope, airbag deployment computer, and the like. Data obtained, and processed data derived from, from the various vehicle systems and sensors can be transmitted to a central monitoring station via the PCS/Cell Modem 102.

Communication with a vehicle driver can be through an infotainment (radio) head unit (not shown) or other display device (not shown). More than one display device can be used. Examples of display devices include, but are not limited to, a monitor, an LCD (Liquid Crystal Display), a projector, and the like. Audio/video entertainment subsystem 109 can comprise a radio receiver, FM, AM, Satellite, Digital and the like. Audio/video entertainment subsystem 109 can comprise one or more media players. An example of a media player includes, but is not limited to, audio cassettes, compact discs, DVD's, Blu-ray, HD-DVDs, Mini-Discs, flash memory, portable audio players, hard disks, game systems, and the like. Audio/video entertainment subsystem 109 can comprise a user interface for controlling various functions. The user interface can comprise buttons, dials, and/or switches. In certain embodiments, the user interface can comprise a display screen. The display screen can be a touch screen. The display screen can be used to provide information about the particular entertainment being delivered to an occupant, including, but not limited to Radio Data System (RDS) information, ID3 tag information, video, and various control functionality (such as next, previous, pause, etc. . . . ), websites, and the like. Audio/video entertainment subsystem 109 can utilize wired or wireless techniques to communicate to various consumer electronics including, but not limited to, cellular phones, laptops, PDAs, portable audio players (such as an iPod), and the like. Audio/video entertainment subsystem 109 can be controlled remotely through, for example, a wireless remote control, voice commands, and the like. In some aspects, processor 106 can provide media to the audio/video entertainment subsystem 109, for playback, display, etc.

The methods, systems, and apparatuses provided can utilize a power management scheme ensuring that a consumer's car battery is not impaired under normal operating conditions. Download of content may be scheduled to minimize battery run down, such as for a predetermined period after the vehicle engine is turned off while within range of a wi-fi hot spot or other short range wireless network signal. Power management algorithms can include battery backup support when the vehicle is off in order to support various wake-up and keep-alive tasks. All data collected subsequent to the last acknowledged download can be maintained in non-volatile memory until the apparatus is reconnected to an external power source. At that point, the apparatus can self re-initialize and resume normal operation. Specific battery chemistry can optimize life/charge cycles. The battery can be rechargeable. The battery can be user replaceable or non-user replaceable.

The apparatus 101 can receive power from power supply 116. The power supply can have many unique features necessary for correct operation within the automotive environment. One mode is to supply a small amount of power (typically less than 100 microamps) to at least one master controller that can control all the other power buses inside of the VTU 101. In an exemplary system, a low power low dropout linear regulator supplies this power to PCS/Cellular modem 102. This provides the static power to maintain internal functions so that it can await external user push-button inputs or await CAN activity via vehicle interface 111. Upon receipt of an external stimulus via either a manual push button or CAN activity, the processor contained within the PCS/Cellular modem 102 can control the power supply 116 to activate other functions within the VTU 101, such as GPS 104/GYRO 105, Processor 106/Memory 107 and 108, SDARS receiver 103, audio/video entertainment system 109, audio codec mux 110, and any other peripheral within the VTU 101 that does not require standby power.

In an exemplary system, there can be a plurality of power supply states. One state can be a state of full power and operation, selected when the vehicle is operating. Another state can be a full power relying on battery backup. It can be desirable to turn off the GPS and any other non-communication related subsystem while operating on the back-up batteries. Another state can be when the vehicle has been shut off recently, perhaps within the last 30 days, and the system maintains communications with a two-way wireless network for various auxiliary services like remote door unlocking and location determination messages. After the recent shut down period, it is desirable to conserve the vehicle battery by turning off almost all power except the absolute minimum in order to maintain system time of day clocks and other functions, waiting to be awakened on CAN activity. Additional power states are contemplated, such as a low power wakeup to check for network messages, but these are nonessential features to the operation of the VTU.

Normal operation can comprise, for example, the PCS/Cellular modem 102 waiting for an emergency push button, key-press, SMS message or CAN activity. Once either is detected, the PCS/Cellular modem 102 can awaken and enable the power supply 116 as required. Shutdown can be similar wherein a first level shutdown turns off everything except the PCS/Cellular modem 102, for example. The PCS/Cellular modem 102 can maintain wireless network contact during this state of operation. The VTU 101 can operate normally in the state when the vehicle is turned off. If the vehicle is off for an extended period of time, perhaps over a vacation etc., the PCS/Cellular modem 102 can be dropped to a very low power state where it no longer maintains contact with the wireless network.

Additionally, in FIG. 1, subsystems can comprise a BlueTooth transceiver 115, or W-LAN transceiver and related circuitry, that can be provided to interface with devices such as phones, headsets, music players, and telematics user interfaces. The apparatus can comprise one or more user inputs, such as emergency button 117 and non-emergency button 118. Emergency button 117 can be coupled to the processor 106. The emergency button 117 can be located in a vehicle cockpit and activated an occupant of the vehicle. Activation of the emergency button 117 can cause processor 106 to initiate a voice and data connection from the vehicle to a central monitoring station, also referred to as a remote call center. Data such as GPS location and occupant personal information can be transmitted to the call center. The voice connection permits two way voice communication between a vehicle occupant and a call center operator. The call center operator can have local emergency responders dispatched to the vehicle based on the data received. In another embodiment, the connections are made from the vehicle to an emergency responder center.

One or more non-emergency buttons 118 can be coupled to the processor 106. One or more non-emergency buttons 118 can be located in a vehicle cockpit and activated by an occupant of the vehicle. Activation of the one or more non-emergency buttons 118 can cause processor 106 to initiate a voice and data connection from the vehicle to a remote call center. Data such as GPS location and occupant personal information can be transmitted to the call center. The voice connection permits two way voice communications between a vehicle occupant and a call center operator. The call center operator can provide location based services to the vehicle occupant based on the data received and the vehicle occupant's desires. For example, a button can provide a vehicle occupant with a link to roadside assistance services such as towing, spare tire changing, refueling, and the like. In another embodiment, a button can provide a vehicle occupant with concierge-type services, such as local restaurants, their locations, and contact information; local service providers their locations, and contact information; travel related information such as flight and train schedules; and the like.

For any voice communication made through the VTU 101, text-to-speech algorithms can be used so as to convey predetermined messages in addition to or in place of a vehicle occupant speaking. This allows for communication when the vehicle occupant is unable or unwilling to communicate vocally.

In an aspect, apparatus 101 can be coupled to a telematics user interface located remote from the apparatus. For example, the telematics user interface can be located in the cockpit of a vehicle in view of vehicle occupants while the apparatus 101 is located under the dashboard, behind a kick panel, in the engine compartment, in the trunk, or generally out of sight of vehicle occupants.

Figure 2:
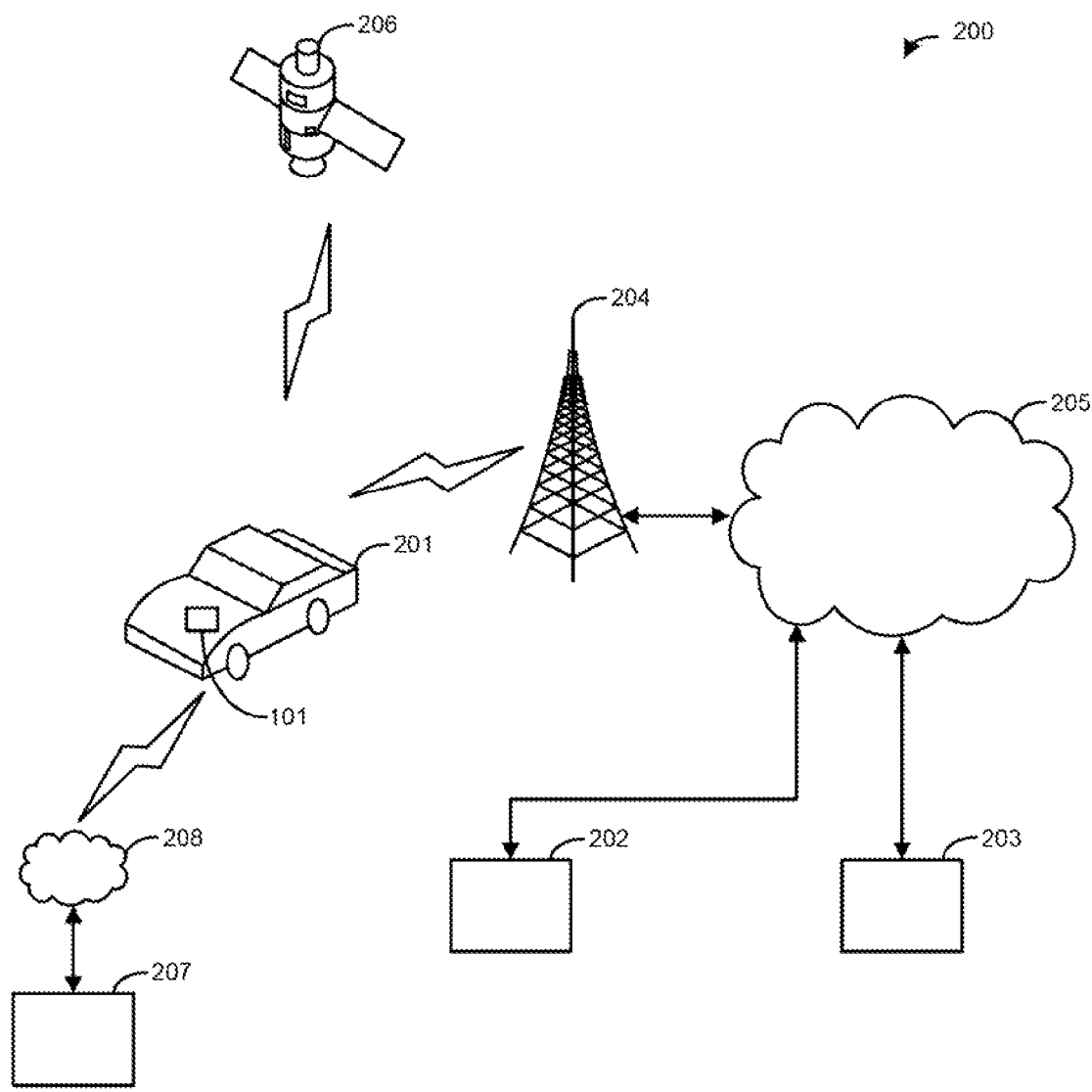
FIG. 2 is an exemplary network environment.

FIG. 2 is a block diagram illustrating an exemplary media sync system 200 showing network connectivity between various components. The media sync system 200 can comprise a VTU 101 located in a motor vehicle 201. The media sync system 200 can comprise a central station 202. The central station 202 can serve as a market specific data gatekeeper. That is, users 203 can pull information from specific, multiple or all markets at any given time for immediate analysis. The distributed computing model has no single point of complete system failure, thus minimizing media sync system 200 downtime. In an embodiment, central station 202 can communicate through an existing communications network (e.g., wireless towers 204 and communications network 205). Media sync system 200 can comprise at least one satellite 206 from which a satellite radio provider can transmit a signal. These signals can be received by a satellite radio in the vehicle 201.

The media sync system 200 can comprise a plurality of users 203 (system subscribers (i.e. consumers), media providers, market researchers, and the like) which can access media sync system 200 using a personal computer (PC) or other such computing device, running a commercially available Web browser. For simplicity, FIG. 2 shows only one user 203. The users 203 can connect to the media sync system 200 via the communications network 205. In an embodiment, communications network 205 can comprise the Internet, and may include a wireless local area network router or gateway which may generate a wi-fi hot spot.

The media sync system 200 can comprise a central station 202 which can comprise one or more central station servers. In some aspects, one or more central station servers can serve as the "back-bone" (i.e., system processing) of the present media sync system 200. One skilled in the art will appreciate that media sync system 200 can utilize servers (and databases) physically located on one or more computers and at one or more locations. Central station server can comprise software code logic that is responsible for handling tasks such as media transcoding, media processing, media storage, media download, media upload, media selection, media recommendation, data interpretations, statistics processing, data preparation and compression, report generation, and the like.

Transcoding is the direct digital-to-digital conversion from one codec to another. It involves decoding/decompressing the original data to a raw intermediate format, in a way that mimics standard playback of the lossy content, and then re-encoding this into the target format. As referred to herein, transcoding can comprise transrating. Transrating is a process similar to transcoding in which files are coded to a lower bitrate without changing formats. As referred to herein, transcoding can comprise transizing. Transizing is a process for changing the picture size of video.

In an embodiment, user 203 can host a server (also referred to as a remote host) that can perform similar functions as a central monitoring station server. In an embodiment of the present media sync system 200, central station servers can have access to a repository database which can be a central store for all information and media within the media sync system 200 (e.g., executable code, subscriber information such as login names, passwords, etc., and vehicle and demographics related data). Central station servers can also provide a "front-end" for the media sync system 200. That is, a central station server can comprise a Web server for providing a Web site which sends out Web pages in response to requests from remote browsers (i.e., users 203). More specifically, a central station server can provide a graphical user interface (GUI) "front-end" to users 203 of the media sync system 200 in the form of Web pages. These Web pages, when sent to the user PC (or the like), can result in GUI screens being displayed.

In a further aspect, the VTU 101 can access media on a user's local computer 207 via a private network 208. Local computer 207 can perform similar functions as a central station server. Private network 208 can comprise a wired and/or wireless home or office network. In a further aspect, local computer 207 can be a commercial establishment that permits access to media stored thereon through private network 208.

Also provided is an electronic interface for consumers to manage the media sync system 200. Users/consumers can actively monitor media stored on the vehicle, media queued to be transmitted to the vehicle, subscription information for one or more third party media providers, and the like through the interface. The interface can be web-based or stored locally on a user computer. One or more of the system features described can be managed accordingly.

The website can have capabilities, including but not limited to, upload and download files, including media files, between two or more devices. The web site can also facilitate receiving and administering rules established by a user for controlling automatic wireless downloads and uploads.

As described above, VTU 101 can communicate with one or more computers, either through direct wireless communication and/or through an internetwork such as the Internet. Such communication can facilitate data transfer, voice communication, and the like. One skilled in the art will appreciate that what follows is a functional description of an exemplary operating environment and that functions can be performed by software, by hardware, or by any combination of software and hardware.

Figure 3:
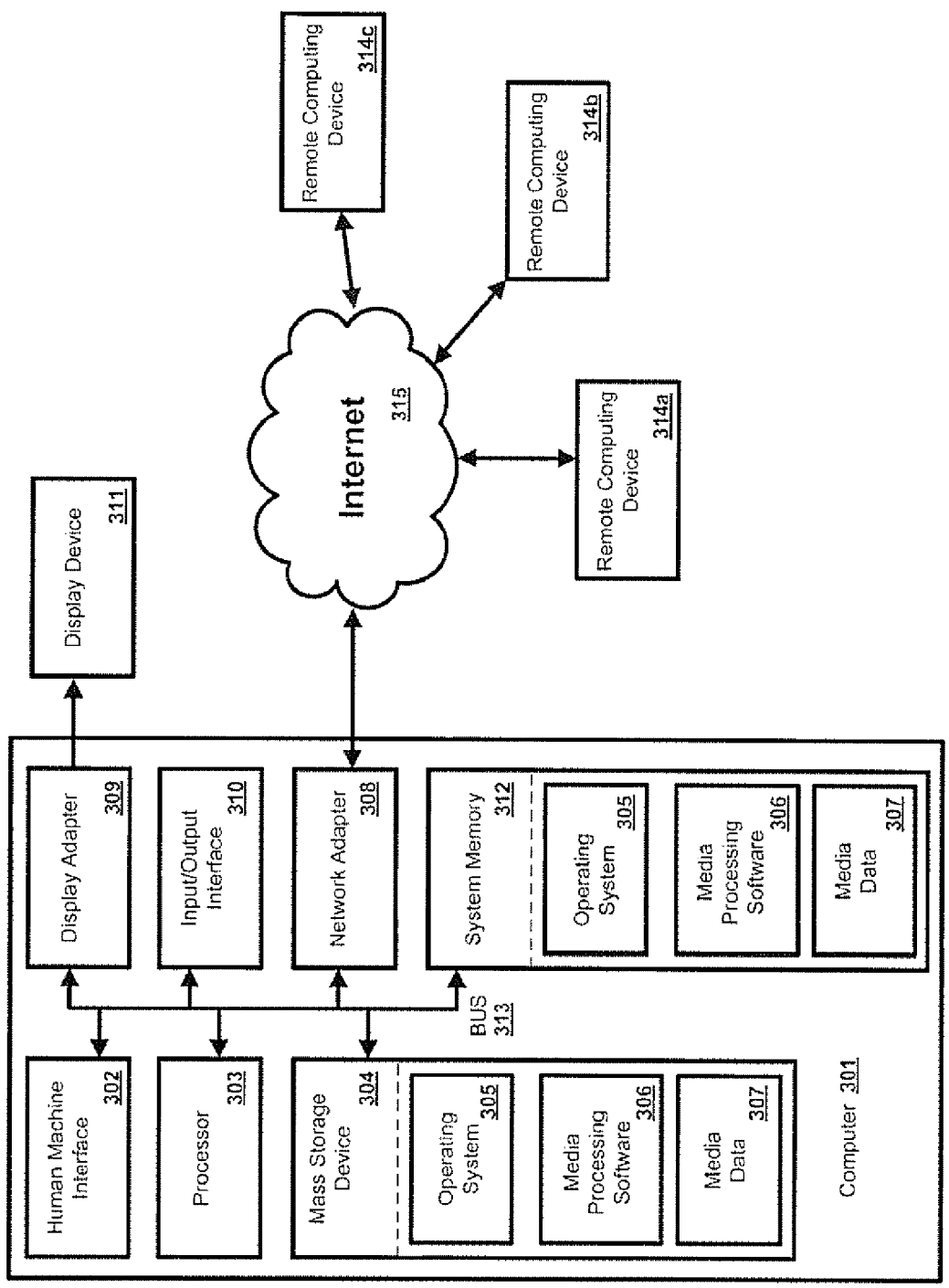
FIG. 3 is an exemplary operating environment.

FIG. 3 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

In another aspect, the methods and systems can be described in the general context of computer instructions, such as program modules, being executed by a computer. Generally, program modules comprise routines, programs, objects, components, data structures, etc. that perform particular tasks or implement particular abstract data types. The methods and systems can also be practiced in distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 301. The components of the computer 301 can comprise, but are not limited to, one or more processors or processing units 303, a system memory 312, and a system bus 313 that couples various system components including the processor 303 to the system memory 312.

The system bus 313 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, PCI-Express bus, Universal Serial Bus (USB), and the like. The bus 313, and all buses specified in this description can also be implemented over a wired or wireless network connection and each of the subsystems, including the processor 303, a mass storage device 304, an operating system 305, telematics software 306, media 307; a network adapter (or communications interface) 308, system memory 312, an Input/Output Interface 310, a display adapter 309, a display device 311, and a human machine interface 302, can be contained within one or more remote computing devices 314a,b,c at physically separate locations, connected through buses of this form, in effect implementing a fully distributed system. In one aspect, a remote computing device can be a VTU 101.

The computer 301 typically comprises a variety of computer readable media. Exemplary readable media can be any available media that is accessible by the computer 301 and comprises, for example and not meant to be limiting, both volatile and non-volatile media, removable and non-removable media. The system memory 312 comprises computer readable media in the form of volatile memory, such as random access memory (RAM), and/or non-volatile memory, such as read only memory (ROM). The system memory 312 typically contains data such as media 307 and/or program modules such as operating system 305 and media processing software 306 that are immediately accessible to and/or are presently operated on by the processing unit 303. Media 307 can comprise data generated by, generated for, received from, or sent to the VTU.

In another aspect, the computer 301 can also comprise other removable/non-removable, volatile/non-volatile computer storage media. By way of example, FIG. 3 illustrates a mass storage device 304 which can provide non-volatile storage of computer code, computer readable instructions, data structures, program modules, and other data for the computer 301. For example and not meant to be limiting, a mass storage device 304 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 304, including by way of example, an operating system 305 and media processing software 306. Each of the operating system 305 and media processing software 306 (or some combination thereof) can comprise elements of the programming and the media processing software 306. Media 307 can also be stored on the mass storage device 304. Media 307 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 301 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 303 via a human machine interface 302 that is coupled to the system bus 313, but can be connected by other interface and bus structures, such as a parallel port, game port, an IEEE 1394 Port (also known as a Firewire port), a serial port, or a universal serial bus (USB).

In yet another aspect, a display device 311 can also be connected to the system bus 313 via an interface, such as a display adapter 309. It is contemplated that the computer 301 can have more than one display adapter 309 and the computer 301 can have more than one display device 311. For example, a display device can be a monitor, an LCD (Liquid Crystal Display), or a projector. In addition to the display device 311, other output peripheral devices can comprise components such as speakers (not shown) and a printer (not shown) which can be connected to the computer 301 via Input/Output Interface 310. Any step and/or result of the methods can be output in any form to an output device. Such output can be any form of visual representation, including, but not limited to, textual, graphical, animation, audio, tactile, and the like.

The computer 301 can operate in a networked environment using logical connections to one or more remote computing devices 314a,b,c. By way of example, a remote computing device can be a personal computer, portable computer, a server, a router, a network computer, a VTU 101, a PDA, a cellular phone, a "smart" phone, a wireless communications enabled key fob, a peer device or other common network node, and so on. Logical connections between the computer 301 and a remote computing device 314a,b,c can be made via a local area network (LAN) and a general wide area network (WAN). Such network connections can be through a network adapter 308. A network adapter 308 can be implemented in both wired and wireless environments. Such networking environments are conventional and commonplace in offices, enterprise-wide computer networks, intranets, and the Internet 315. In one aspect, the remote computing device 314a,b,c can be one or more VTU 101's.

For purposes of illustration, application programs and other executable program components such as the operating system 305 are illustrated herein as discrete blocks, although it is recognized that such programs and components reside at various times in different storage components of the computing device 301, and are executed by the data processor(s) of the computer. An implementation of media processing software 306 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Figure 4:
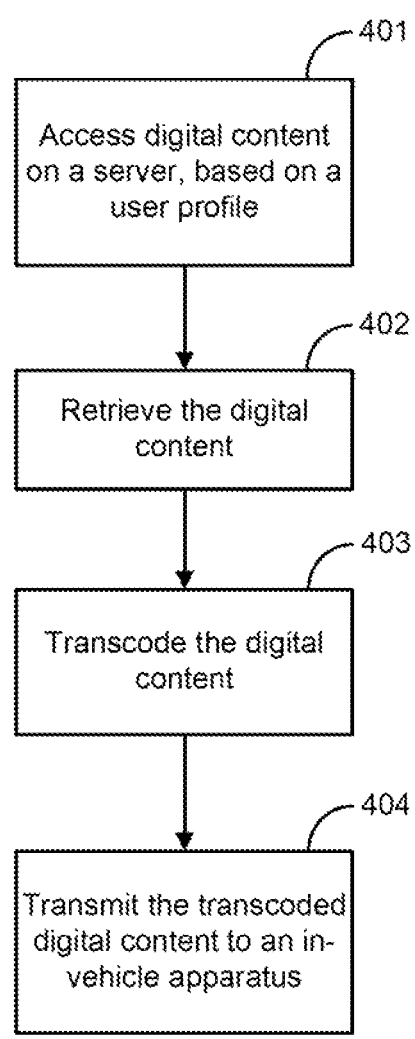
FIG. 4 is an exemplary method of operation.

In an aspect, illustrated in FIG. 4, provided are methods for digital content transfer, comprising accessing digital content on a server, based on a user profile at 401, retrieving the digital content at 402, possibly, but not necessarily, transcoding the digital content at 403, and transmitting the digital content to an in-vehicle apparatus at 404. The server can be a commercial third party server configured to sell digital content. The user profile can comprise user account information for the server. The user profile comprises user transcoding preferences. The user transcoding preferences comprise one or more of, video quality and audio quality. The methods can further comprise receiving a request from the in-vehicle apparatus for the digital content. Transmitting the transcoded digital content can comprise transmitting the transcoded digital content on a predetermined schedule.

The methods can further comprise, transmitting a suggestion for alternative digital content based on previously experienced digital content. The methods can further comprise, transmitting an advertisement for a good or service based on the previously experienced digital content and/or digital content downloaded.

Figure 5:
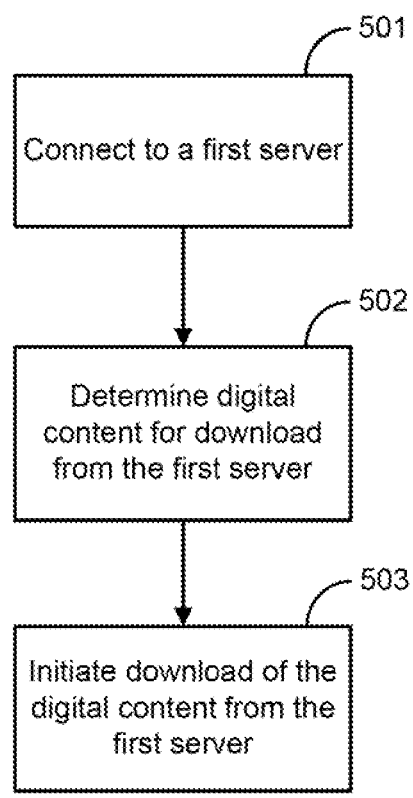
FIG. 5 is an exemplary method of operation.

In another aspect, illustrated in FIG. 5, provided are methods for digital content delivery, comprising connecting to a first server at 501, determining digital content for download from the first server at 502, and initiating download of the digital content from the first server at 503. Connecting to a first server can comprise connecting on a predetermined schedule, connecting when network access is available, combinations thereof, and the like. Determining digital content for download from the first server can comprise determining if digital content has been previously viewed, determining if digital content has been marked for download, determining if digital content has been marked as recommended for download, combinations thereof, and the like. Initiating download of the digital content from the first server can comprise transmitting a download request to the first server. The methods can further comprise receiving the digital content.

The first server can be a commercial third party server configured to sell digital content. The first server can be a central monitoring station server. The methods can further comprise accessing the first server based on a user profile comprising user account information. The user profile can comprise user transcoding preferences. The user transcoding preferences comprise one or more of, video quality and audio quality.

The methods can further comprise downloading, by the first server, the digital content from a second server. The first server can be a central monitoring station server and the second server can be a commercial third party server.

The methods can further comprise, receiving a suggestion for alternative digital content based on previously experienced digital content. The methods can further comprise, receiving an advertisement for a good or service based on the previously experienced digital content and/or digital content downloaded.

Connecting to the first server can be initiated based on a triggering event. The triggering event can comprise one or more of, determination of W-LAN network access, high speed network access, proximity to a commercial establishment supporting media delivery, turning off a vehicle's engine, and the like.

Figure 6:
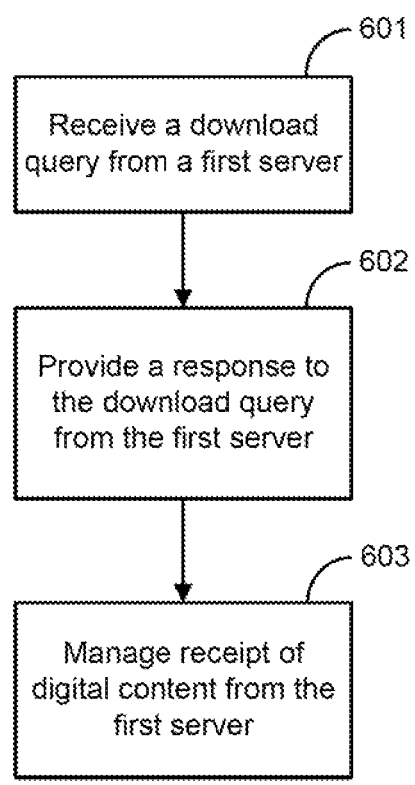
FIG. 6 is an exemplary method of operation.

In another aspect, illustrated in FIG. 6, provided are methods for digital content delivery, comprising receiving a download query from a first server at 601, providing a response to the download query from the first server at 602, and managing receipt of digital content from the first server at 603. Receiving a download query from a first server can comprise receiving the download query on a predetermined schedule, when network access is available, combinations thereof, and the like. Providing a response to the download query from the first server can comprise transmitting a signal to the first server. The signal can comprise a list of digital content stored on a vehicle, digital content viewed, digital content requested, combinations thereof, and the like. Managing receipt of digital content from the first server can comprise storing received digital content, marking received digital content as "new," combinations thereof, and the like. The methods can further comprise receiving the digital content.

The first server can be a commercial third party server configured to sell digital content. The first server can be a central monitoring station server. The methods can further comprise accessing the first server based on a user profile comprising user account information. The user profile can comprise user transcoding preferences. The user transcoding preferences comprise one or more of, video quality and audio quality.

The methods can further comprise downloading, by the first server, the digital content from a second server. The first server can be a central monitoring station server and the second server can be a commercial third party server.

The methods can further comprise, receiving a suggestion for alternative digital content based on previously experienced digital content. The methods can further comprise, receiving an advertisement for a good or service based on the previously experienced digital content and/or digital content downloaded.

Receiving the download query can be initiated based on a triggering event. The triggering event can comprise one or more of, network access, high speed network access, proximity to a commercial establishment supporting media delivery, and the like.

Figure 7:
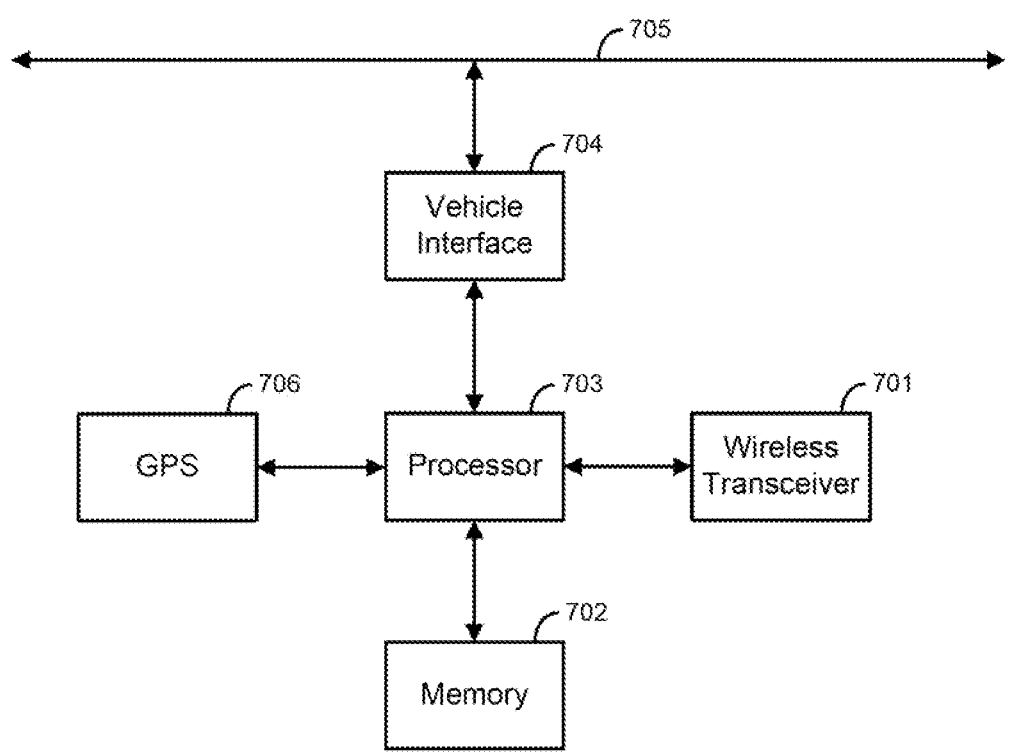
FIG. 7 is an exemplary apparatus.

In another aspect, illustrated in FIG. 7, provided is an apparatus for digital content transfer, comprising a first transceiver 701, configured for downloading digital content, a memory 702, configured for storing digital content, and a processor 703, coupled to the first transceiver 701 and the memory 702, wherein the processor 703 is configured to perform one or more steps of the methods described herein. In an aspect, the apparatus can be configured for receiving a download query from a first server, providing a response to the download query from the first server, and managing receipt of digital content from the first server. In another aspect, the apparatus can be configured for connecting to a first server, determining digital content for download from the first server, and initiating download of the digital content from the first server.

In an aspect, the apparatus can further comprise a vehicle interface 704, coupled to a vehicle bus 705, wherein the vehicle interface 704 is configured to receive data through the vehicle bus 705, and a GPS 706 configured to determine vehicle location.

The apparatus can comprise an input device coupled to the processor. The processor can be further configured to receive one or more user preferences through the input device.

The apparatus can further comprise a second transceiver. The first transceiver can be a cellular transceiver and the second transceiver can be a WiFi transceiver. However, any combination of transceivers can be used. For example, the first transceiver can be one or more of a cellular transceiver, a satellite transceiver, and the like. For example, the second transceiver can be one or more of, a Wifi transceiver, a WiMAX transceiver, an ultra wideband transceiver, a Bluetooth transceiver, and the like. The processor can be configured to determine which of the first or second transceivers is connected with a higher bandwidth and to preferentially utilize the higher bandwidth transceiver. The processor can also determine which of the transceivers to use to download content based on predetermined user rules. For example, if the higher bandwidth service (typically cellular) costs more per downloaded byte than the other services, an algorithm running on the processor cause the processor to select the next highest bandwidth service. Or, the algorithm may evaluate the time of day, and if a server attempts to download content during an off-peak period when the higher bandwidth service does not cost as much during another period, the algorithm may cause the processor to control download via the higher bandwith service.

In an aspect, the first server can be configured to store a user profile comprising user account information for a second server and utilize the user profile to access digital content on the second server. In another aspect, the first server and/or the second server can be a commercial third party server configured to sell digital content. The user profile can comprise user transcoding preferences. The user transcoding preferences can comprise one or more of, video quality and audio quality.

The apparatus can be coupled to a vehicle entertainment system configured to present digital content, perhaps transcoded content, to a vehicle occupant, or device in the vehicle. The processor can be further configured to request digital content from the first server on a predetermined schedule. The processor can be further configured to predict the predetermined schedule based on vehicle location and usage.

The apparatus can be configured for receiving a suggestion for alternative digital content based on previously experienced digital content. The apparatus can be configured can be configured for receiving an advertisement for a good or service based on the previously experienced digital content and/or digital content downloaded.

Figure 8:
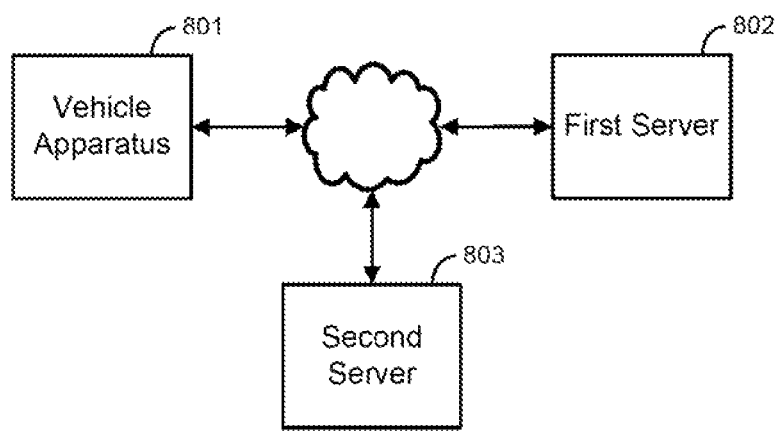
FIG. 8 is an exemplary system.

In another aspect, illustrated in FIG. 8, provided is a system for digital content transfer, comprising a vehicle apparatus 801 comprising a first transceiver for receiving digital content and a memory for storing digital content, a first server 802, configured for storing digital content, and a second server 803, configured for obtaining digital content from the first server 802, and providing the digital content to the vehicle apparatus 801, perhaps the content being in transcoded form.

The vehicle apparatus can further comprises a second transceiver. The first transceiver can be a cellular transceiver and the second transceiver is a WiFi transceiver. However, any combination of transceivers can be used. For example, the first transceiver can be one or more of a cellular transceiver, a satellite transceiver, and the like. For example, the second transceiver can be one or more of, a Wifi transceiver, a WiMAX transceiver, an ultra wideband transceiver, a Bluetooth transceiver, and the like. The vehicle apparatus can be configured to determine which of the first or second transceivers is connected with a higher bandwidth and to preferentially utilize the higher bandwidth transceiver. The system can be configured to utilize either the first or the second transceiver based on a user preference. The user preference can be based on type of digital content. The user preference can also be determined based on data rate, or data pricing, as discussed above. Preferably, the second server and account information server containing user information, such as pricing plans for data usage by a given user can be linked with one another according to a user identifier. The user can associate the same user identifier with information in the account information server, and the user can also associate the user identifier with content that has been uploaded to the second server.

The first server can be a commercial third party server configured to sell digital content. The second server can be configured to store user account information for the first server and utilize the user account information to access digital content on the first server. The second server can be configured to store a user profile, wherein the user profile comprises user transcoding preferences. The user transcoding preferences can comprise one or more of, video quality and audio quality. The system can further comprise a vehicle entertainment system configured to present the digital content to a vehicle occupant.

The apparatus can be further configured to request digital content from the second server on a predetermined schedule, when network access is available, combinations thereof, and the like. The apparatus can be further configured to predict the predetermined schedule based on vehicle location and usage.

Figure 9:
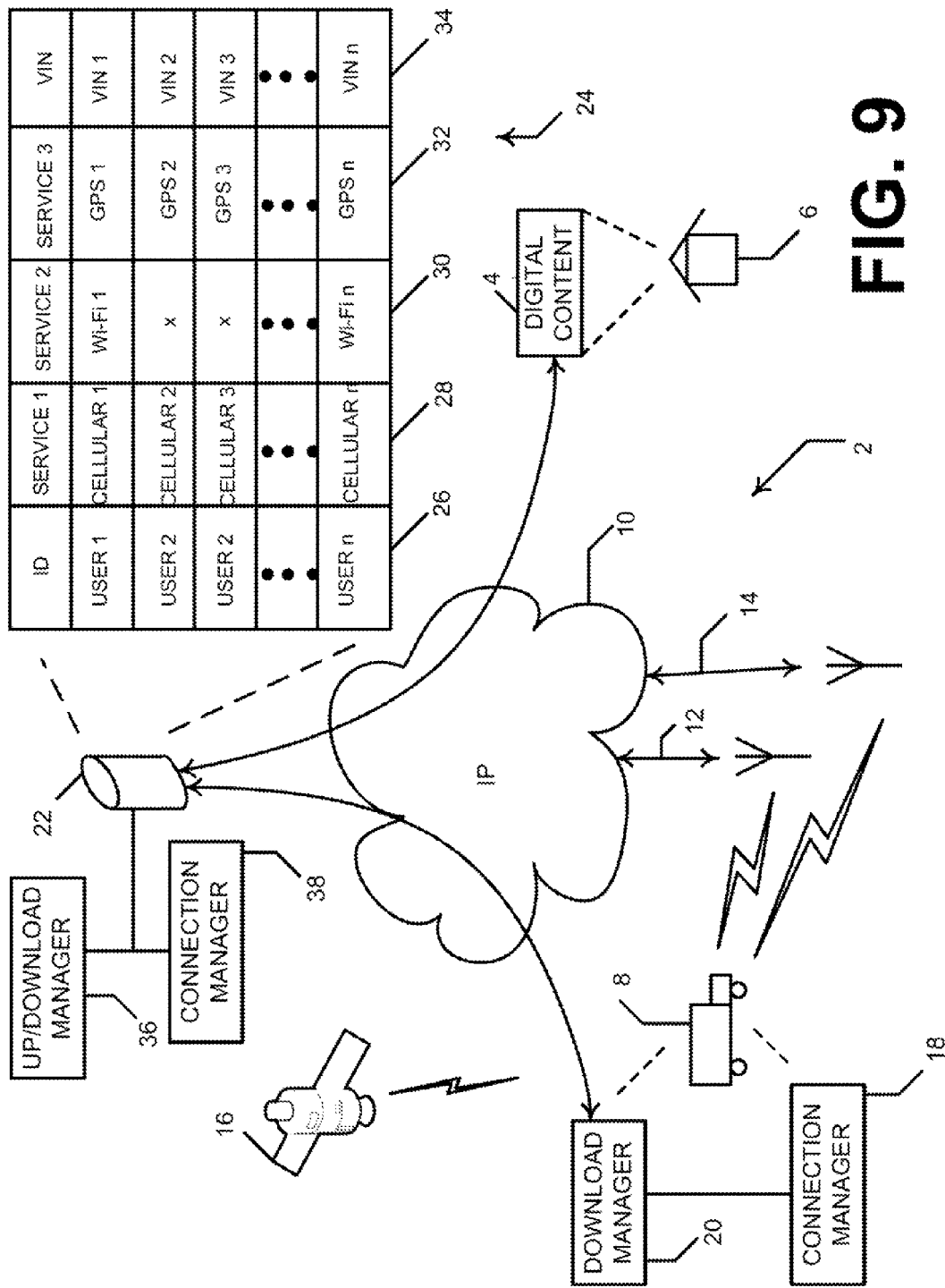
FIG. 9 illustrates a system for transferring content between a user device and a vehicle.

Turning now to FIG. 9, the figure illustrates a diagram of a system 2 for transferring digital content 4 from a first user device, typically located at a fixed location like a home 6, to a second user device, typically a mobile device, such as a telematics unit in a vehicle 8. For purposes of discussion, reference to house 6 and vehicle 8 herein is also a reference to a first user device and a second user device (typically referred to herein as a vehicle device or apparatus), respectively. For example, reference to first user device 6 may be interpreted a a reference to auser device, such as a personal computer, entertainment device, or smartphone, inside house 6, wherein the user device in the house is coupled to network 10 via a wired connection, or a wireless connection. Furthermore, reference to vehicle 8 may be interpreted as a reference to a second user device that is mobile, and which can be fixed to the vehicle or can be a device, such as a smartphone, carried by a user of the vehicle. The second user device can also couple to internetwork 10 via a plurality of wireless links, which links 12 and 14 represent. However, it will be appreciated that second user device 8 can use more than two types of wireless links to couple to the communication network 10. Examples of wireless links 12 and 14 include: Bluetooth, GPRS and other mobile wireless communication technologies, and a wireless local area network or hot spot such as a wireless router/gateway may facilitate. It will be appreciated that devices 6 and 8 can both couple to internetwork 10 via the same wireless link.

For example, a user may connect his laptop PC to internetwork 10 via a home wireless broadband modem that couples via a wired connection to the internet. Vehicle device 8 may also connect to internetwork 10 through the same wireless broadband wireless modem when in the presence of the broadband modem. Thus, download manager 20 can automatically send a download request through the wireless broadband modem at house 6 over internetwork 10 when parked in the driveway, or garage, of the house. Upon receiving the download request, a download manager at server location 22 can authenticate device 8 according to a comparison of information received in the download request with information in table 24. The download managers manage the download of content 4 that a user previously uploaded from device 6 to server 22.

In addition, user device 8 typically also communicates with a Global Positioning Satellite system ("GPS"), represented by satellite 16. Connection manager 18 and download manager 20 can use GPS position information regarding the location of user device 8 to intelligently optimize the time, and location, that user device 8 should download digital content from intermediate server 22.

A telematics services operator typically operates one, or more, servers 22, at a central location, for communicating with user devices such as second user device 8.

In addition, servers 22 can store information regarding user devices and the users who use them. Furthermore, the servers can store and access account information related to a user's unique identifier. Intermediate server 22 at an operator's central location, for example, may include user account table 24. User account table 24 associates each of a plurality of users unique identifier 26 with the corresponding user's account information. For example, columns 28, 30, and 32 compose a matrix that indicates which of a plurality of wireless communication link types a subscriber, or user, subscribes to.

In table 24 as illustrated in the FIG. 9, all users 1 through n subscribe to cellular service. In addition, user 1 subscribes to WiFi service and user 2 subscribes to another wireless service, for example, satellite using the same satellites as GPS, which may, or may not, also use WiFi. For example, the WiFi service provider for user 1 may charge the user 1 a first amount for every byte downloaded, and provider of the plan of user 2 may charge a different rate for each byte of data downloaded. Or, subscriber 1 may subscribe to a flat rate plan, where every byte costs the same about regardless of the time of day, and user 2 may subscribe to a plan that costs more during business hours than during evening hours, for example. In addition, the wifi plan may include use of the user's own wireless broadband modem, which would not typically incur a charge to the user.

In the figure, table 24 illustrates an association between a user's identifier 26 and other information. The identifier may comprise a clear version of a login credential and a hashed version of a password. Or, the user identifier could be another form unique to a given user. The other information associated with identifier 26 may include an account identifier 28 of a first service, an identifier of a second service 30, and an identifier of a third service 32. In addition, table 24 may associate a vehicle identification number ("VIN") with a user. It will be appreciated that a given user ID 26 may have more than one VIN 34 associated with it.

A typical scenario for downloading content to the second user device 8 would be where the user of the second user device parks his, or her, car at house 6. After work, the user may decide to use the user device in house 6 to download digital content 4 from the internet, which may be represented by communication network 10. After downloading the digital content 4, the user instructs the first user device 6 to transfer the downloaded content 4 to second user device 8. Even though second user device 8 is parked at a location having approximately the same GPS coordinates as first user device 6, the first user device transfers the content to intermediate server 22 rather than directly to the second user device. Thus, when the user has turned off vehicle 8, the process of uploading content 4 to second user device 8 may begin. Or, the user may have previously uploaded the content to intermediate server 22, which may automatically begin downloading the previously uploaded content upon receiving a download request and authentication credentials from the download manager 8. At the request of download manager 20, connection manager 18 may determine whether to connect to network 10 over a free wireless home network or a subscription wireless network, depending on signal strength of available wireless signals. In addition, connection manager may be configured to provide authentication credentials to the operator of networks 12 and 14, including a commercial operator or merely to the users own wireless network device. Typically, a 'free' hot spot provided by a commercial enterprise, such as a retail store may provide in its parking lot, would not require authentication information. In such a scenario, a connection manager at intermediate server 22 may restrict downloads from a freely accessible hot spot to prevent hacking and general malfeasance with respect to the intermediate server.

After the digital content 4 has been uploaded to intermediate server 22, download manager 20 can initiate the process of downloading the content from server 22. Download manager 20 can query connection manager 18 and determine which communication links (represented by links 12 and 14) it can use for download. Then, after determining which links it can, or should, use, the download manager can query the user account information table 24 to determine which of the connection links to use. Alternatively, vehicle device 8 can contain information that download manager 20 can access that the vehicle device can use to determine which connection link to use to communicate over internetwork 10. Download manager 20 can decide which connection to use based on predetermined user preferences, and determine which link to use based on the speed and cost preferences the user has provided to the download manager. For example, user 2 from table 24 may subscribe to cellular service and WiFi service, which may have a different cost per byte transferred based on the time of day, as discussed above. The user of first and second user devices may place a higher priority on cost rather than download speed. The user can assign weighting values to factors for cost and download speed. The weighting values can be stored in a memory accessible buy download manager 20, either at second user device 8 or at the location of intermediate server 22. Download manager can be programmed to determine the best communication links (in this case either a cellular link or the WiFi link) based on the preference values the use has assigned to the cost factor and to the download speed factor. On a scale of 1 to 10, with 10 representing the highest preference, if the user assigns a weighting value of 10 to the cost factor, and a 1 to the speed factor, download manager may determine that if the user has requested the transfer of 1 megabyte of data, the difference in cost may not be enough of a difference to avoid using the cellular link to download the digital content 4, However, if the user has selected to transfer 10 megabytes, or more, of data 4, then the download manager may determine that the user prefers a slower, although less expensive, download session, as the greater cost outweighs the preference for speed. The download manager may make this determination more often when the cellular service provider charges a session initiation fee, in addition to a fee based on the number of bytes transferred; at low data amounts, the session initiation fee would tend to compose most of the transfer charge, and thus the transfer cost between using cellular link and the wifi link might not be significant. But, as the amount of data to transfer became larger, so to would the charge for the transfer as the session initiation fee composed a smaller and smaller portion of the total transfer fee.

In another scenario, even though a user may have entered a preference heavily biased toward a preference for lower cost over higher speed, the second user device 8 may only have access to a cellular network in a given location. For example, when a user device 8 is located at the user's home, the device may not have access to a WiFi signal if the user's broadband modem is inoperable. However, once the user starts his, or her, commute to work, the user device 8 may pass through WiFi hot spots. A table in the user device may store the geographical coordinates that define the range of the one, or more, hot spots along a route, or anywhere. As the user starts driving vehicle 8, the second user device can use location information received from GPS 16 to predict what route the user is following. Based on the prediction, the download manager can determine that although second user device 8 is not currently within range of a wifi hot spot, it will be within two minutes. Thus, the download manager can decide to postpone downloading until the second user device 8 is within range of the known hot spot, and thus, the download manager instruct the connection manager to search for a wifi hot spot so as soon as it is within range, the second'user device can start downloading the digital content 4 via wifi rather than a cellular link.

Alternatively, if the user begins a journey from home in the evening, the download rate for cellular data transfer may be less than during business hours (FIG. 9 does not illustrate this scenario, but the figure would indicated the scenario as a separate column in table 24 with a different cost per byte rate, for example). In such an alternative scenario, the cost difference between using a cellular connection and a wifi, or other, connection link may not be great enough to warrant waiting the two minutes before downloading in the wifi hotspot. Of course, the higher the weighting value the user places on the cost factor would tend to cause download manager 20 to determine that it should wait until coming within range of the wifi hotspot, even though the evening download cost per byte is less than during business hours.

The download manager 20 may also interact with GPS circuitry included in the vehicle device 8 to determine when to initiate a download. For example, the vehicle device 8 may be configured to periodically query current GPS coordinates from its GPS circuitry and compare the current coordinate values with a predetermined geographical area defined by a mathematical equation. The area represented by the equation may be referred to as a geofence. The equation for a circle having a predetermined radius and centered at coordinates corresponding to the user's house 6 is an example of a geofence. When vehicle device 8 determines that its current location coordinates lie within the predetermined circle, the download manager 20 of the vehicle device 8 can automatically initiate a pending download of content from intermediate server 22 by sending authentication credentials and a download request thereto. Alternately, a download manager 36 running on server 22 can periodically receive the current location coordinates of vehicle device 8 and compare them with the predefined circle equation. If the comparison indicates that vehicle is located within the circle, the server download manager 36 can automatically request authentication credentials from the vehicle device 8. Server 22 can then authenticate vehicle device 8 and permit it to download content that may have been previously uploaded thereto. It will be appreciated that download manager 20 or connection manager 18 may interact with server 22 in providing log in credentials.

In another aspect, the download manager 36 at server 22, which may also be referred to as an upload manager 36, may reject an upload of content files from user device 6. The upload manager my query table 24, which may associate various equipment and software, including software version, with the VIN of vehicle 8, and thus with the user attempting to upload music. If an upload manager 36 at server 22 determines that a user at house 6 attempts to upload a video file, for example, of a type the head unit in vehicle 8 does not support, then the upload manager my cause the server to send a rejection message to user device 6 indicating that the server will not receive and store the desired content. If someone upgrades the hardware, or software, of vehicle device 8 at a later time, and the upgrades support the previously rejected file type, then the server will associate the information corresponding to the upgrades with the VIN in table 24, and thereafter permit the uploading of the previously rejected file types to the server for later download to vehicle device 8.

In another aspect, the download manager 36 can determine, according to a user's login credentials, that download manager 20 at vehicle 8 is configured only to download content files for a predetermined amount of time after the engine of the vehicle stops running. This prevents battery run down in vehicle 8. Thus, download manager 36 can determine, based on a connection bandwidth rate for example, the bandwidth corresponding to the user's wireless broadband modem at location 6. Using the bandwidth of the preferred connection, preferably the user's home wireless broadband modem or router, and the predetermined amount of time after motor shutoff that either connection manager 18 or download manager 20 will permit the wireless circuitry to operate while downloading content, upload manger 36 may only permit upload of as much data that the vehicle can download over the preferred data link during the predetermined download time. Thus, a user may have 100 songs he wishes to download from a commercial web site over interne 10 to user device 6 and then to server 22, or directly from the commercial site to server 22, and then to vehicle device 8 upon the vehicle device entering a predetermined geo fence. But, if the download rate multiplied by the amount of download time permitted by the vehicle device 8 only permits downloading 10 song files, then upload manager at server 22 may only allow the user to upload ten song files from user device 6, or a commercial song file provider, for temporary storage at server 22. It will be appreciated that one way download manager 20 may trigger the initiation of a download after entering a predetermined geo fence is to a send a download request and authentication credentials when a driver turns off the engine of vehicle 8. Another trigger for initiating a download would be to send a download request message when the transmission of vehicle 8 is in park, or neutral, with the parking brake applied. This would indicate that the vehicle will probably remain stationary for a period long enough for the communication link managed by connection manager 18 to remain active. If a download begins while a vehicle is in motion, connection manager 18 may have to constantly search and manage connecting with various wireless links as the vehicle comes within range and then leave the effective signal range of a given wireless link to internet 10. Other event triggers that could initiate a download could include intermittent stopping and moving of the vehicle within a given geographic area, which may be referred to as a geo block or a quad. Such intermittent motion could indicate that vehicle 8 is operating in stop and go city traffic, which could indicate that if connection manager 18 establishes a connection with a wireless link, the download is likely to complete before the vehicle moves outside the range of the wireless link's signal.

Turning now to FIG. 10, the figure illustrates a method 1000 for uploading content to a centrally located server over an internetwork. Method 1000 begins at step 1005. At step 1010, a user requests permission to upload content to a server coupled to an internetwork, either from a user device coupled to the internetwork, or from a commercial web site also coupled to the internetwork. The server may allow upload if certain rules are met. One rule would be that the device requesting upload successfully authenticates to the server using login credentials. Another rule may be that only a certain amount of content can be uploaded, or that only certain types of content can be uploaded. The server can determine this by checking the installed equipment and software corresponding to a VIN associated with the log in credentials.

If the device requesting upload satisfies the rules, at step 1015 the server permits upload of content files and stores them for later download by a vehicle device corresponding to the users login credentials.

At step 1020, a vehicle connection manager running on a vehicle telematics device, for example, requests a connection to the server. At step 1025, a download manager running on the vehicle device responds to a trigger event, such as entering a geo fence, turning off the vehicle engine in the presence of a wireless network connected to the internetwork, and requests the stored content from the central server. At step 1030, the central server provides the content to the requesting vehicle device, which proceeds to download the content and store it on the vehicle device at step 1035. The vehicle device makes the content files available for playing, by, for example, displaying the file names of the downloaded content on a screen and providing a means, such as a touch screen for selecting one, or more, of the files to play through an audio head unit of the vehicle. Method 1000 ends at step 1040.

Turning now to FIG. 11, the figure illustrates a method 1100 for editing selections and preferences for features, content, services, software, and parameter options available for equipment, software, and content installed and configured in a vehicle. Method 1100 starts at step 1105 and proceeds to step 1110, where a central computer, for example a telematics provider's server, receives a request message from a user interface to update features, content, services, software, and parameter options related to a user's vehicle. The user enters his login information through the user interface, such as a web page on a browser, or an application running on a computer or smartphone, or similar user device, and the interface forwards the login information to the central computer.

Based on the received user login information, the central computer searches a telematics table at step 1110 and locates a record matching the login information. The matching record typically associates a VIN and a user's financial information, such as a credit account number, with the login information.

At step 1115, the central computer determines the VIN that matches the login information of the user, and locates information particular to the corresponding vehicle and equipment, software, and content installed and configured therein. The vehicle information may be in a separate table that relates records to a telematics database according to VIN. Or, the vehicle information may be part of the same table in the record corresponding to the matching VIN. If separate, the tables may be distributed across computer platforms.

Before providing the vehicle information that matches the VIN to the user interface, the central computer may query the vehicle to determine whether the vehicle information in the table is current. Typically, the vehicle TCU may be programmed to report current module status of installed equipment, software and content to the central computer periodically, or at every crank up, or at some other predetermined interval or trigger. Or, the TCU may only update the central computer when an equipment change is made. At some point, the information stored in the tables may not match the equipment installed in the vehicle or the content files stored in the vehicle, or the software versions loaded in various vehicle modules may not match the information stored in the tables. Thus, the TCU may also update the tables with information relative to its corresponding vehicle's installed equipment, content, and software upon a query by the central computer at step 1120. The central computer may then present the current configuration of equipment, software, and content via the user interface at step 1120.

After the central computer has updated the vehicle information in the tables, and displayed current configuration information, the central computer receives input from the user interface requesting the presentation of configurable features, content, services, software, and parameter options, or other editable information associated with a particular piece of equipment, software, or content currently configured in the vehicle. For example, a user may wish to make performance changes to engine operating parameters. This would typically involve edits to the engine control module software. Or, a user may wish to make changes to a song play list loaded on the audio head unit module in the vehicle. Or, a user may wish to edit a charging schedule for the batteries if the vehicle is an electric vehicle.

If the user uses the interface to request the presentation of the current song list saved in the vehicle's head unit, the central computer forwards song list information to the user interface, which then can display the list in a predetermined format, and then provide an interface that allows the user cut, copy or paste, for example, content to and from the TCU and another device. The user performs his preferred selecting or editing action at step 1125.

At step 1130, the central computer determines whether the selected edit or other action requires a fee from the user. If so, for example copying a sing from a web site to the TCU may require a download fee, central computer retrieves financial information from the record in table 50 associated with the user login information, and then debits the associated financial account accordingly at step 1135. At step 1140, the central computer performs, or facilitates, the requested selections, edits, or downloads, and method 1100 ends at step 1145. If the central computer determined at step 1130 that the user's selection, or requested action, does not require a fee, method 1100 proceeds to step 1140 and continues as described above.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for transferring content files from a user device to a vehicle device, comprising:
   receiving the content files transmitted from the user device over a communication network;
   receiving a transfer request, transmitted over the communication network from the vehicle device, to transfer the content files to the vehicle device;
   transcoding the requested content files according to preferences stored in a user profile wherein the user profile is stored on a centrally located intermediate server and wherein the centrally located intermediate server performs the transcoding;
   transmitting the requested content files to the vehicle device; and
   wherein the user device transmits the content files to the communication network through a gateway device, and wherein the vehicle device transmits the transfer request and receives the content files from the communication network through the gateway device, wherein the user device transmits content files through the gateway device when the user device is in the presence of the gateway device, and wherein the vehicle device transmits the transfer request and receives the content files in response to the transfer request when the vehicle device is within the presence of the gateway device.

2. The method of claim 1 further comprising, receiving authentication credentials from the vehicle device transmitted through the gateway device and over the communication network before processing the transfer request and before transmitting the content files to the vehicle device.

3. The method of claim 1 wherein the transfer request is received from the vehicle device upon it entering a predetermined geographic boundary corresponding to the gateway device.

4. A system for digital content transfer, comprising:
a vehicle device for interfacing and communicating with other vehicle devices, the vehicle device including a first transceiver for wirelessly requesting upon an occurrence of a triggering event, and for wirelessly receiving, digital content and a memory for storing digital content;
a centrally located intermediate server, configured for obtaining digital content from a remote server over a communication network and for providing digital content to the vehicle device in response to a digital content download request received from the vehicle device over the communication network;
wherein the centrally located intermediate server transcodes the requested digital content according to a user preference stored in a user profile, wherein the centrally located intermediate server is configured to store the user profile that comprises the user preferences; and
wherein the vehicle device transmits the digital content download request and receives digital content files in response to the digital content download request when the vehicle device is within the presence of a gateway device, and wherein the digital content download request includes vehicle information that the centrally located intermediate server uses to look up stored user account information for gaining permission to download digital content from the remote server.

5. The system of claim 4, wherein the vehicle device further comprises a second transceiver.

6. The system of claim 5, wherein the first transceiver is a cellular transceiver and the second transceiver is a WiFi transceiver.

7. The system of claim 6, wherein the vehicle device is configured to determine which of the first or second transceivers is connected with a higher bandwidth and to preferentially utilize the higher bandwidth transceiver.

8. The system of claim 4, wherein the remote server is a commercial third party server configured to sell digital content.

9. The system of claim 1, wherein the user preferences comprise one or more transcoding preferences each associated with a different level of content quality.

10. The system of claim 4, further comprising a vehicle entertainment system configured to present the digital content to a vehicle occupant.

11. The system of claim 4, wherein the vehicle device is configured to request digital content from the central server according to a predetermined schedule.

12. The system of claim 11, wherein the vehicle device is further configured to request digital content according to the predetermined schedule based on vehicle location and usage.

13. A vehicle device configured to synchronize content stored thereon with content stored on a remote user device, comprising:
a hardware processor configured to perform steps of determining that a trigger event has occurred, wirelessly transmitting a download request message over a communication network requesting the download of any content pending download from a central server, and wirelessly receiving the content corresponding to the download request message;
wherein the vehicle device transmits the content download request message and receives the content files in response to content download request message when the vehicle device is within the presence of a gateway device, and wherein the content download request messages includes vehicle information that corresponds to user account information that permits downloading of content from a remote content server; and
wherein the content is transcoded at a centrally located intermediate server according to a preference stored in a user profile at the centrally located intermediate server.

14. The vehicle device of claim 13 further comprising a GPS circuit coupled to the hardware processor wherein the trigger event includes receiving location coordinates from the GPS circuitry that indicate that the vehicle device has come within a predetermined range of a predetermined location.

15. The vehicle device of claim 13 wherein the hardware processor is configured to wirelessly transmit and receive signals over one, or more, service levels including cellular service, WiFi service, and Bluetooth service.

16. The vehicle device of claim 15 wherein the processor is configured to wirelessly transmit and receive signals using WiFi service only while the engine of the vehicle corresponding to the vehicle device is running.

17. The vehicle device of claim 15 wherein the hardware processor is configured to wirelessly receive SMS signals using cellular service while the engine of the vehicle corresponding to the vehicle device is not running.

18. The vehicle device of claim 17 wherein the hardware processor is configured to awaken from a sleep mode upon receiving a wake-up signals via SMS and wherein the processor is configured to then wirelessly transmit the request message and receive content via a WiFi service link.

19. The system of claim 4 wherein the vehicle information includes a unique vehicle identification number of the vehicle.

20. The vehicle device of claim 13 wherein the vehicle information includes a unique vehicle identification number of the vehicle.

* * * * *